(12) United States Patent
Takeda et al.

(10) Patent No.: US 11,753,499 B2
(45) Date of Patent: *Sep. 12, 2023

(54) CURABLE RESIN COMPOSITION, ADHESIVE, IMIDE OLIGOMER, IMIDE OLIGOMER COMPOSITION, AND CURING AGENT

(71) Applicant: SEKISUI CHEMICAL CO., LTD., Osaka (JP)

(72) Inventors: Kohei Takeda, Osaka (JP); Sayaka Wakioka, Osaka (JP); Yuta Oatari, Osaka (JP); Takashi Shinjo, Osaka (JP); Masami Shindo, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 575 days.

This patent is subject to a terminal disclaimer.

(21) Appl. No.: 16/492,378

(22) PCT Filed: Jan. 26, 2018

(86) PCT No.: PCT/JP2018/002367
§ 371 (c)(1),
(2) Date: Sep. 9, 2019

(87) PCT Pub. No.: WO2018/139558
PCT Pub. Date: Aug. 2, 2018

(65) Prior Publication Data
US 2021/0130536 A1   May 6, 2021

(30) Foreign Application Priority Data
Jan. 27, 2017 (JP) .................................. 2017-013558

(51) Int. Cl.
| | | |
|---|---|---|
| C08G 59/40 | (2006.01) | |
| C08G 73/10 | (2006.01) | |
| C08L 63/00 | (2006.01) | |
| C08L 79/08 | (2006.01) | |
| C09J 163/00 | (2006.01) | |
| C09J 179/08 | (2006.01) | |

(52) U.S. Cl.
CPC ..... *C08G 59/4042* (2013.01); *C08G 73/1007* (2013.01); *C08G 73/1071* (2013.01); *C08G 2170/00* (2013.01)

(58) Field of Classification Search
None
See application file for complete search history.

(56) References Cited

U.S. PATENT DOCUMENTS

| | | | |
|---|---|---|---|
| 4,585,852 A * | 4/1986 | Lo | C08G 73/1053 528/172 |
| 5,147,943 A * | 9/1992 | Inoue | C08L 79/08 525/533 |
| 5,891,367 A | 4/1999 | Basheer et al. | |
| 6,294,259 B1 * | 9/2001 | Anderson | C09J 179/08 523/455 |
| 7,157,587 B2 | 1/2007 | Mizori et al. | |
| 7,208,566 B2 | 4/2007 | Mizori et al. | |
| 2007/0074896 A1 * | 4/2007 | Tanaka | C08G 59/4042 174/259 |
| 2008/0058476 A1 | 3/2008 | Whiteker et al. | |
| 2012/0059119 A1 | 3/2012 | Bito et al. | |
| 2018/0002485 A1 | 1/2018 | Tanigawa et al. | |

FOREIGN PATENT DOCUMENTS

| | | |
|---|---|---|
| CN | 106010420 | 10/2016 |
| EP | 1 918 341 | 5/2008 |
| JP | 61-270852 | 12/1986 |
| JP | 02-191623 | 7/1990 |
| JP | 7-224269 | 8/1995 |
| JP | 2000-109645 | 4/2000 |
| JP | 2001-316469 | 11/2001 |
| JP | 2004-502859 | 1/2004 |
| JP | 2004-323728 | 11/2004 |
| JP | 2007-091799 | 4/2007 |
| JP | 2008-063298 | 3/2008 |
| JP | 2008-255249 | 10/2008 |
| JP | 2009-258367 | 11/2009 |
| JP | 2010-001352 | 1/2010 |
| JP | 2011-42730 | 3/2011 |
| JP | 2011-222810 | 11/2011 |
| JP | 2012-1701 | 1/2012 |
| JP | 2012-67240 | 4/2012 |

(Continued)

OTHER PUBLICATIONS

International Search Report dated May 21, 2019 in International (PCT) Application No. PCT/JP2019/010905.
International Search Report and International Preliminary Report on Patentability dated Mar. 20, 2018 in International (PCT) Application No. PCT/JP2018/002367.
International Search Report and International Preliminary Report on Patentability dated May 1, 2018 in International (PCT) Application No. PCT/JP2018/002368.
Extended European Search Report dated Nov. 24, 2021, in European Application No. 19777376.5.

(Continued)

*Primary Examiner* — Randy P Gulakowski
*Assistant Examiner* — Ha S Nguyen
(74) *Attorney, Agent, or Firm* — Wenderoth, Lind & Ponack, L.L.P.

(57) ABSTRACT

An imide oligomer is provided for use in a cured product that has a high glass transition temperature after curing and is excellent in thermal decomposition resistance, adhesiveness, and long-term heat resistance. Also provided are a curable resin composition and an imide oligomer composition each containing the imide oligomer, an adhesive containing the curable resin composition, and a curing agent containing the imide oligomer composition.

15 Claims, No Drawings

(56) References Cited

FOREIGN PATENT DOCUMENTS

| | | |
|---|---|---|
| JP | 2012-097206 | 5/2012 |
| JP | 2013-199645 | 10/2013 |
| JP | 2014-194013 | 10/2014 |
| JP | 2015-117278 | 6/2015 |
| JP | 2016-020437 | 2/2016 |
| JP | 2016-41797 | 3/2016 |
| JP | 2016-069651 | 5/2016 |
| JP | 2016-131243 | 7/2016 |
| JP | 2016-147946 | 8/2016 |
| JP | 2016-172824 | 9/2016 |
| JP | 2016-203379 | 12/2016 |
| WO | 02/04572 | 1/2002 |
| WO | 2005/100433 | 10/2005 |
| WO | 2008/032669 | 3/2008 |
| WO | 2010/128667 | 11/2010 |
| WO | 2016/114286 | 7/2016 |
| WO | 2016/171101 | 10/2016 |
| WO | 2017/027482 | 2/2017 |

OTHER PUBLICATIONS

Product Information of Imide Extended BMI, Designer Molecules Inc., Dec. 28, 2020, https://www.designermoleculesinc.com/products.cfm.

"Build Performance and Cost-Efficiency Into Your Formulation", Huntsman, Feb. 2020, pp. 1-28; https://huntsman-pimcore.equisolve-dev.com/Documents/Huntsman_Selector_guide_for_formulators.pdf.

* cited by examiner

CURABLE RESIN COMPOSITION, ADHESIVE, IMIDE OLIGOMER, IMIDE OLIGOMER COMPOSITION, AND CURING AGENT

TECHNICAL FIELD

The present invention relates to an imide oligomer usable in a cured product that has a high glass transition temperature after curing and is excellent in thermal decomposition resistance, adhesiveness, and long-term heat resistance. The present invention also relates to a curable resin composition and an imide oligomer composition each containing the imide oligomer, an adhesive containing the curable resin composition, and a curing agent containing the imide oligomer composition.

BACKGROUND ART

Curable resins such as epoxy resins have low shrinkage and have excellent adhesiveness, insulation, and chemical resistance. Such curable resins are used in many industrial products. In particular, curable resin compositions that provide good results in a solder reflow test concerning short-time heat resistance or in a thermal cycle test concerning repeated heat resistance are frequently used in electronic device applications.

In recent years, in-vehicle electronic control units (ECUs), power devices containing SiC or GaN, and the like have attracted attention. Curable resin compositions used in these applications are required to have heat resistance when continuously exposed to high temperature for a long time (long-term heat resistance), rather than short-time or repeated heat resistance.

Patent Literature 1 discloses an imide oligomer curing agent having an acid anhydride structure at both ends as a curing agent used for curable resin compositions. However, such a curing agent has insufficient compatibility with curable resins such as epoxy resins, so that the resulting curable resin composition has poor long-term heat resistance.

Patent Literatures 2 and 3 disclose curable resin compositions containing, as a curing agent, a polyimide in which a flexible silicone skeleton or alicyclic skeleton is introduced to improve the compatibility with curable resins. Introducing a silicone skeleton or an alicyclic skeleton, however, tends to reduce the glass transition temperature of the resulting cured product, leading to poor mechanical strength or long-term heat resistance at the operation temperature of ECUs, power devices, or the like.

Patent Literature 4 discloses an imide oligomer which is formed using an acid dianhydride having a specific structure and which has phenolic hydroxy groups or aniline amino groups at both ends. However, from the standpoint of the solubility in a solvent, the use of such an imide oligomer requires the use of a high polar solvent, which may cause poor storage stability or insufficient solubility in curable resins. The imide oligomer thus may fail to be taken in the cured product and become residue to reduce the long-term heat resistance.

CITATION LIST

Patent Literature

Patent Literature 1: JP S61-270852 A
Patent Literature 2: JP 2016-20437 A
Patent Literature 3: JP 2016-69651 A
Patent Literature 4: WO 2005/100433

SUMMARY OF INVENTION

Technical Problem

The present invention aims to provide an imide oligomer usable in a cured product that has a high glass transition temperature after curing and is excellent in thermal decomposition resistance, adhesiveness, and long-term heat resistance. The present invention also aims to provide a curable resin composition and an imide oligomer composition each containing the imide oligomer, an adhesive containing the curable resin composition, and a curing agent containing the imide oligomer composition.

Solution to Problem

The present invention relates to a curable resin composition containing: a curable resin; and an imide oligomer, the curable resin composition containing, as the imide oligomer, at least one of an imide oligomer having a structure of the following formula (1-1) and a number average molecular weight of 900 or more and 4,000 or less or an imide oligomer having a structure of the following formula (1-2) and a number average molecular weight of 550 or more and 4,000 or less.

The present invention also relates to an imide oligomer having a structure of the following formula (1-1) and a number average molecular weight of 900 or more and 4,000 or less or having a structure of the following formula (1-2) and a number average molecular weight of 550 or more and 4,000 or less.

[Chem. 1]

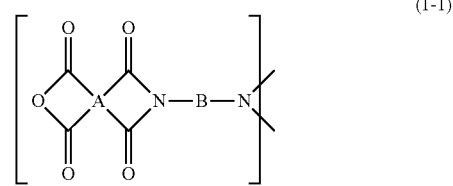

(1-1)

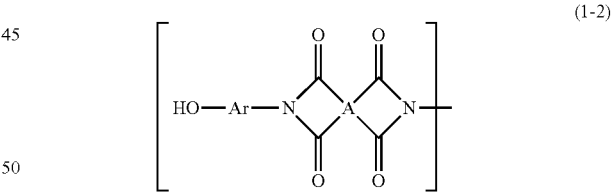

(1-2)

In the formula (1-1) and the formula (1-2), A is a tetravalent group of the following formula (2-1) or the following formula (2-2); in the formula (1-1), B is a divalent group of the following formula (3-1) or the following formula (3-2); and in the formula (1-2), Ar is a substituted or unsubstituted divalent aromatic group.

[Chem. 2]

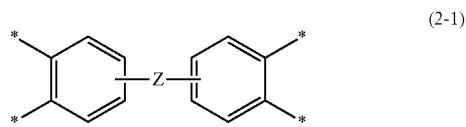

(2-1)

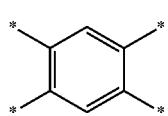 (2-2)

In the formula (2-1) and the formula (2-2), * is a binding site; in the formula (2-1), Z is a bond, an oxygen atom, or a substituted or unsubstituted divalent hydrocarbon group that may have an oxygen atom at a binding site; and in the formula (2-1) and the formula (2-2), a hydrogen atom of an aromatic ring may be replaced.

[Chem. 3]

 (3-1)

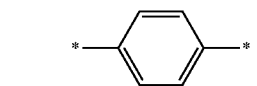 (3-2)

In the formula (3-1) and the formula (3-2), * is a binding site; in the formula (3-1), Y is a bond, an oxygen atom, or a substituted or unsubstituted divalent hydrocarbon group; and in the formula (3-1) and the formula (3-2), a hydrogen atom of an aromatic ring may be replaced.

The present invention is described in detail below.

The present inventors found out that the use of an imide oligomer having a specific structure and a number average molecular weight in a specific range as a curing agent of a curable resin composition allows production of a cured product that has a high glass transition temperature after curing and is excellent in thermal decomposition resistance, adhesiveness, and long-term heat resistance. The inventors thus completed the present invention.

The imide oligomer of the present invention has a structure of the above formula (1-1) or the above formula (1-2). The presence of a structure of the above formula (1-1) or the above formula (1-2) allows the imide oligomer of the present invention to have excellent reactivity and compatibility with curable resins such as epoxy resins. The imide oligomer of the present invention may have the structure of the above formula (1-1) or the above formula (1-2) at one end or both ends. When the imide oligomer has the structure of the above formula (1-1) or the above formula (1-2) at both ends, the crosslinking density is increased, so that a high glass transition temperature can be obtained after curing. When the imide oligomer has the structure of the above formula (1-1) or the above formula (1-2) at one end, the functional group equivalent amount is large, which allows the curable resin composition to contain an increased amount of the imide oligomer of the present invention. The resulting cured product thus has excellent long-term heat resistance.

The imide oligomer of the present invention has a number average molecular weight of 900 or more and 4,000 or less when the imide oligomer has a structure of the above formula (1-1). The imide oligomer of the present invention has a number average molecular weight of 550 or more and 4,000 or less when the imide oligomer has a structure of the above formula (1-2). With the number average molecular weight within the range, a cured product obtained using the imide oligomer of the present invention as a curing agent has excellent long-term heat resistance. The lower limit of the number average molecular weight when the imide oligomer has a structure of the above formula (1-1) is preferably 950, more preferably 1,000, and the upper limit thereof is preferably 3,400, more preferably 2,800. The lower limit of the number average molecular weight when the imide oligomer has a structure of the above formula (1-2) is preferably 580, more preferably 600, and the upper limit thereof is preferably 3,400, more preferably 2,800.

The "number average molecular weight" as used herein means a value in terms of polystyrene determined by gel permeation chromatography (GPC) using tetrahydrofuran as a solvent. The column for the measurement of the number average molecular weight in terms of polystyrene by GPC may be JAIGEL-2H-A (available from Japan Analytical Industry Co., Ltd.), for example.

The imide oligomer of the present invention is preferably an imide oligomer having no siloxane skeleton in its structure because the siloxane skeleton may reduce the glass transition temperature after curing or cause defective adhesion by contaminating an adherend.

Specifically, the imide oligomer of the present invention is preferably an imide oligomer of the following formula (4-1), the following formula (4-2), the following formula (4-3), or the following formula (4-4), or an imide oligomer of the following formula (5-1), the following formula (5-2), following the formula (5-3), or the following formula (5-4).

[Chem. 4]

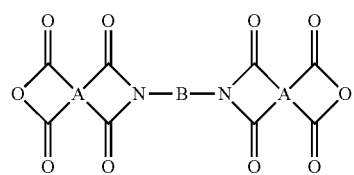 (4-1)

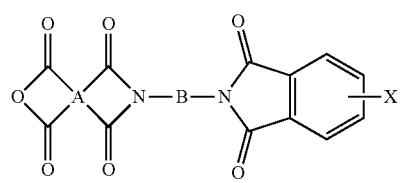 (4-2)

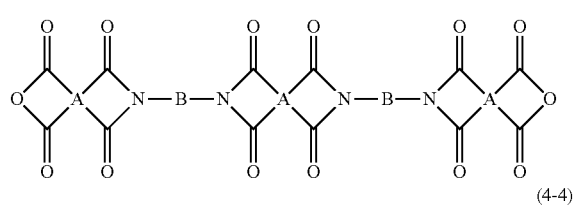 (4-3)

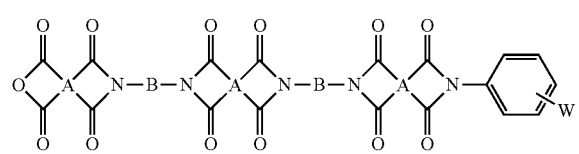 (4-4)

In the formulae (4-1) to (4-4), A is a tetravalent group of the following formula (6-1) or the following formula (6-2); in the formula (4-1), the formula (4-3), and the formula (4-4), each A may be the same or different; in the formulae (4-1) to (4-4), B is a divalent group of the following formula (7-1) or the following formula (7-2); in the formula (4-3) and the formula (4-4), each B may be the same or different; in the formula (4-2), X is a hydrogen atom, a halogen atom, or a substituted or unsubstituted monovalent hydrocarbon group; and in the formula (4-4), W is a hydrogen atom, a halogen atom, or a substituted or unsubstituted monovalent hydrocarbon group.

[Chem. 5]

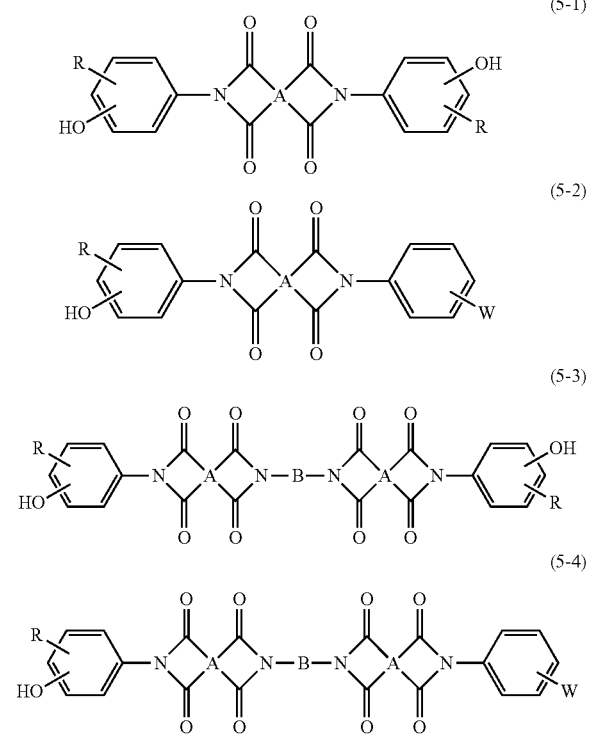

In the formulae (5-1) to (5-4), A is a tetravalent group of the following formula (6-1) or the following formula (6-2); in the formula (5-3) and the formula (5-4), each A may be the same or different; in the formulae (5-1) to (5-4), R is a hydrogen atom, a halogen atom, or a substituted or unsubstituted monovalent hydrocarbon group; in the formula (5-1) and the formula (5-3), each R may be the same or different; in the formula (5-2) and the formula (5-4), W is a hydrogen atom, a halogen atom, or a substituted or unsubstituted monovalent hydrocarbon group; and in the formula (5-3) and the formula (5-4), B is a divalent group of the following formula (7-1) or the following formula (7-2).

[Chem. 6]

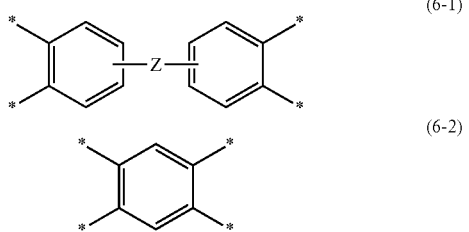

In the formula (6-1) and the formula (6-2), * is a binding site; in the formula (6-1), Z is a bond, an oxygen atom, or a substituted or unsubstituted divalent hydrocarbon group that may have an oxygen atom at a binding site; and in the formula (6-1) and the formula (6-2), a hydrogen atom of an aromatic ring may be replaced.

[Chem. 7]

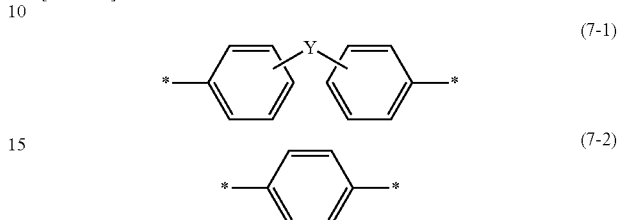

In the formula (7-1) and the formula (7-2), * is a binding site; in the formula (7-1), Y is a bond, an oxygen atom, or a substituted or unsubstituted divalent hydrocarbon group; in the formula (7-1) and the formula (7-2), a hydrogen atom of an aromatic ring may be replaced.

Among the imide oligomers of the present invention, the imide oligomer having a structure of the above formula (1-1) may be produced by, for example, reacting an acid dianhydride of the following formula (8) with a diamine of the following formula (9).

[Chem. 8]

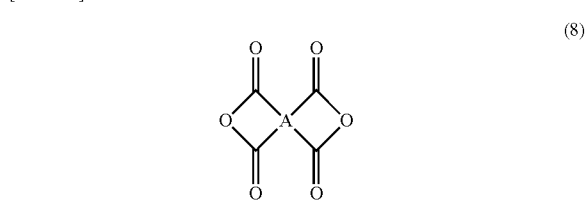

In the formula (8), A is the same tetravalent group as A in the above formula (1-1).

[Chem. 9]

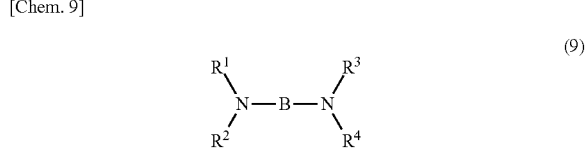

In the formula (9), B is the same divalent group as B in the above formula (1-1). $R^1$ to $R^4$ are each independently a hydrogen atom or a monovalent hydrocarbon group.

The following shows a specific exemplary method for reacting an acid dianhydride of the above formula (8) with a diamine of the above formula (9).

First, the diamine of the above formula (9) is dissolved in a solvent in which the amic acid oligomer to be obtained by reaction can be dissolved (e.g., N-methylpyrrolidone). To the resulting solution is added the acid dianhydride of the above formula (8), and the mixture is reacted to give an amic acid oligomer solution. Next, the solvent is removed by heating, depressurization, or the like. Then, the amic acid oligomer is reacted by heating at about 200° C. or higher for one hour or longer. An imide oligomer having a desired number average molecular weight and having a structure of the above formula (1-1) at both ends can be obtained by adjusting the molar ratio between the acid dianhydride of the above formula (8) and the diamine of the above formula (9) and imidization conditions.

By replacing part of the acid dianhydride of the above formula (8) with an acid anhydride of the following formula (10), it is possible to produce an imide oligomer having a desired number average molecular weight and having a structure of the above formula (1-1) at one end and a structure derived from the acid anhydride of the following formula (10) at the other end. In this case, the acid dianhydride of the above formula (8) and the acid anhydride of the following formula (10) may be added at the same time or separately.

By replacing part of the diamine of the above formula (9) with a monoamine of the following formula (11), it is possible to produce an imide oligomer having a desired number average molecular weight and having a structure of the above formula (1-1) at one end and a structure derived from the monoamine of the following formula (11) at the other end. In this case, the diamine of the above formula (9) and the monoamine of the following formula (11) may be added at the same time or separately.

[Chem. 10]

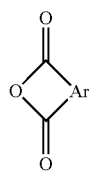

(10)

In the formula (10), Ar is a substituted or unsubstituted divalent aromatic group.

[Chem. 11]

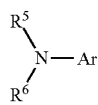

(11)

In the formula (11), Ar is a substituted or unsubstituted monovalent aromatic group, and $R^5$ and $R^6$ are each independently a hydrogen atom or a monovalent hydrocarbon group.

Among the imide oligomers of the present invention, the imide oligomer having a structure of the above formula (1-2) may be produced by, for example, reacting an acid dianhydride of the above formula (8) with a phenolic hydroxy group-containing monoamine of the following formula (12).

[Chem. 12]

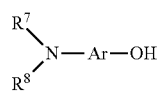

(12)

In the formula (12), Ar is a substituted or unsubstituted divalent aromatic group, and $R^7$ and $R^8$ are each independently a hydrogen atom or a monovalent hydrocarbon group.

The following shows a specific exemplary method for reacting an acid dianhydride of the above formula (8) and a phenolic hydroxy group-containing monoamine of the above formula (12).

First, the phenolic hydroxy group-containing monoamine of the formula (12) is dissolved in a solvent in which the amic acid oligomer to be obtained by reaction can be dissolved (e.g., N-methylpyrrolidone). To the resulting solution is added the acid dianhydride of the above formula (8), and the mixture is reacted to give an amic acid oligomer solution. Next, the solvent is removed by heating, depressurization, or the like. Then, the amic acid oligomer is reacted by heating at about 200° C. or higher for one hour or longer. An imide oligomer having a desired number average molecular weight and having a structure of the above formula (1-2) at both ends can be obtained by adjusting the molar ratio between the acid dianhydride of the above formula (8) and the phenolic hydroxy group-containing monoamine of the above formula (12) and imidization conditions.

By replacing part of the phenolic hydroxy group-containing monoamine of the above formula (12) with a monoamine of the above formula (11), it is possible to produce an imide oligomer having a desired number average molecular weight and having a structure of the above formula (1-2) at one end and a structure derived from the monoamine of the above formula (11) at the other end. In this case, the phenolic hydroxy group-containing monoamine of the above formula (12) and the monoamine of the above formula (11) may be added at the same time or separately.

Examples of the acid dianhydride of the above formula (8) include pyromellitic dianhydride, 3,3'-oxydiphthalic dianhydride, 3,4'-oxydiphthalic dianhydride, 4,4'-oxydiphthalic dianhydride, 4,4'-(4,4'-isopropylidenediphenoxy)diphthalic anhydride, 4,4'-bis(2,3-dicarboxylphenoxy)diphenyl ether dianhydride, p-phenylenebis(trimellitate anhydride), and 2,3,3',4'-biphenyltetracarboxylic dianhydride.

In particular, for better solubility and better heat resistance, the acid dianhydride used as a raw material of the imide oligomer of the present invention is preferably an aromatic acid dianhydride having a melting point of 240° C. or lower, more preferably an aromatic acid dianhydride having a melting point of 220° C. or lower, still more preferably an aromatic acid dianhydride having a melting point of 200° C. or lower, particularly preferably 3,4'-oxydiphthalic dianhydride (melting point: 180° C.) or 4,4'-(4,4'-isopropylidenediphenoxy)diphthalic anhydride (melting point: 190° C.)

The "melting point" as used herein means a value measured as the endothermic peak temperature using a differential scanning calorimeter at a temperature increase rate of 10° C./min. The differential scanning calorimeter may be EXTEAR DSC6100 (available from SII NanoTechnology Inc.), for example.

Examples of the diamine of the above formula (9) include 3,3'-diaminodiphenylmethane, 3,4'-diaminodiphenylmethane, 4,4'-diaminodiphenylmethane, 3,3'-diaminodiphenyl ether, 3,4'-diaminodiphenyl ether, 4,4'-diaminodiphenyl ether, o-phenylenediamine, m-phenylenediamine, p-phenylenediamine, 3,3'-diaminodiphenylsulfone, 4,4'-diaminodiphenylsulfone, 1,3-bis(3-aminophenoxy)benzene, 1,3-bis(4-aminophenoxy)benzene, 1,4-bis(4-aminophenoxy)benzene, bis(4-(4-aminophenoxy)phenyl)methane, 2,2-bis (4-(4-aminophenoxy)phenyl)propane, 1,3-bis(2-(4-aminophenyl)-2-propyl)benzene, 1,4-bis(2-(4-aminophenyl)-2-propyl)benzene, 3,3'-diamino-4,4'-dihydroxyphenylmethane, 4,4'-diamino-3,3'-dihydroxyphenylmethane, 3,3'-diamino-4,4'-dihydroxyphenyl ether, bisaminophenylfluorene, bistoluidinefluorene, 4,4'-bis(4-aminophenoxy)biphenyl, 4,4'-diamino-3,3'-dihydroxyphenyl ether, 3,3'-diamino-4,4'-dihydroxybiphenyl, and 4,4'-diamino-2,2'-dihydroxybiphenyl. Preferred among them are 4,4'-diaminodiphenylmethane, 4,4'-diaminodiphenyl ether, 1,3-bis(2-(4-aminophenyl)-2-propyl)benzene, 1,4-bis(2-(4-aminophenyl)-2-propyl)benzene, 1,3-bis(3-aminophenoxy)benzene, 1,3-bis(4-aminophenoxy)benzene, and 1,4-bis(4-aminophenoxy)benzene because they have excellent availability. More preferred are 1,3-bis(2-(4-aminophenyl)-2-propyl)benzene, 1,4-bis(2-(4-aminophenyl)-2-propyl)benzene, 1,3-bis(3-aminophenoxy)benzene, 1,3-bis(4-aminophenoxy)benzene, and 1,4-bis(4-aminophenoxy)benzene because they have excellent solubility and excellent heat resistance.

Examples of the acid anhydride of the above formula (10) include phthalic anhydride, 3-methylphthalic anhydride, 4-methylphthalic anhydride, 1,2-naphthalic anhydride, 2,3-naphthalic anhydride, 1,8-naphthalic anhydride, 2,3-anthracenedicarboxylic anhydride, 4-tert-butylphthalic anhydride, 4-ethynylphthalic anhydride, 4-phenylethynylphthalic anhydride, 4-fluorophthalic anhydride, 4-chlorophthalic anhydride, 4-bromphthalic anhydride, and 3,4-dichlorophthalic anhydride.

Examples of the monoamine of the above formula (11) include aniline, o-toluidine, m-toluidine, p-toluidine, 2,4-dimethylaniline, 3,4-dimethylaniline, 3,5-dimethylaniline, 2-tert-butylaniline, 3-tert-butylaniline, 4-tert-butylaniline, 1-naphthylamine, 2-naphthylamine, 1-aminoanthracene, 2-aminoanthracene, 9-aminoanthracene, 1-aminopyrene, 3-chloroaniline, o-anisidine, m-anisidine, p-anisidine, 1-amino-2-methylnaphthalene, 2,3-dimethylaniline, 2,4-dimethylaniline, 2,5-dimethylaniline, 3,4-dimethylaniline, 4-ethylaniline, 4-ethynylaniline, 4-isopropylaniline, 4-(methylthio)aniline, and N,N-dimethyl-1,4-phenylenediamine.

Examples of the phenolic hydroxy group-containing monoamine of the above formula (12) include 3-aminophenol, 4-aminophenol, 4-amino-o-cresol, 5-amino-o-cresol, 4-amino-2,3-xylenol, 4-amino-2,5-xylenol, 4-amino-2,6-xylenol, 4-amino-1-naphthol, 5-amino-2-naphthol, 6-amino-1-naphthol, and 4-amino-2,6-diphenylphenol. Preferred among them are 4-amino-o-cresol and 5-amino-o-cresol because they have excellent availability and excellent storage stability and lead to a high glass transition temperature.

When the imide oligomer of the present invention is produced by any of the above methods, the imide oligomer of the present invention is obtained as a component of a mixture (imide oligomer composition) containing multiple types of imide oligomers each having a structure of the above formula (1-1) or multiple types of imide oligomers each having a structure of the above formula (1-2) and raw materials. When the imide oligomer composition has an imidization ratio of 70% or higher, the use of the imide oligomer composition as a curing agent leads to a cured product having better mechanical strength at high temperature and better long-term heat resistance. An imide oligomer composition containing the imide oligomer of the present invention and having an imidization ratio of 70% or higher is also encompassed by the present invention.

The lower limit of the imidization ratio of the imide oligomer composition of the present invention is preferably 75%, more preferably 80%.

There is no particular preferable upper limit of the imidization ratio of the imide oligomer composition of the present invention. The upper limit is practically 98%.

The "imidization ratio" is measured using a Fourier transform infrared spectrophotometer (FT-IR) by the attenuated total reflection method (ATR method). The imidization ratio can be determined using the following formula based on the peak absorbance area near 1660 cm$^{-1}$ derived from the carbonyl group of amic acid. The Fourier transform infrared spectrophotometer may be UMA 600 (available from Agilent Technologies, Inc.), for example. The "Peak absorbance area of amic acid oligomer" in the following formula is the absorbance area of an amic acid oligomer obtained by reacting the acid dianhydride with the diamine or the phenolic hydroxy group-containing monoamine and then removing the solvent by evaporation or the like without the imidization step.

Imidization ratio (%)=100×(1−(Peak absorbance area after imidization)/(Peak absorbance area of amic acid oligomer))

The imide oligomer composition of the present invention is preferably soluble in an amount of 3 g or more in 10 g of tetrahydrofuran at 25° C. from the standpoint of the solubility when the imide oligomer composition is used as a curing agent in a curable resin composition.

The imide oligomer composition of the present invention preferably has a melting point of 200° C. or lower from the standpoint of the handleability when the imide oligomer composition is used as a curing agent in a curable resin composition. The melting point of the imide oligomer composition of the present invention is more preferably 190° C. or lower, still more preferably 180° C. or lower.

The lower limit of the melting point of the imide oligomer composition of the present invention is not limited, but is preferably 60° C. or higher.

The lower limit of the amount of the imide oligomer of the present invention in 100 parts by weight of the imide oligomer composition of the present invention is preferably 50 parts by weight. When the amount of the imide oligomer of the present invention is 50 parts by weight or more, the imide oligomer composition of the present invention is more suitable as a curing agent. The lower limit of the imide oligomer of the present invention is more preferably 60 parts by weight.

There is no particular preferable upper limit of the amount of the imide oligomer of the present invention. The upper limit is practically 98 parts by weight.

The curable resin composition of the present invention contains a curable resin and the imide oligomer of the present invention. The curable resin composition of the present invention preferably contains, as the imide oligomer of the present invention, at least one of an imide oligomer of the above formula (4-1), the above formula (4-2), the above formula (4-3), or the above formula (4-4) or an imide oligomer of the above formula (5-1), the above formula (5-2), the above formula (5-3), or the above formula (5-4).

As described above, the imide oligomer composition of the present invention allows production of a cured product that has excellent mechanical strength at high temperature and excellent long-term heat resistance when the imide oligomer composition is used as a curing agent of a curable resin composition. A curing agent containing the imide oligomer composition of the present invention is also encompassed by the present invention. The curable resin composition of the present invention preferably contains the curing agent of the present invention to contain the imide oligomer of the present invention.

In the curable resin composition of the present invention, the lower limit of the amount of the curing agent of the present invention is preferably 50 parts by weight and the upper limit thereof is preferably 500 parts by weight relative to 100 parts by weight of the curable resin. When the amount of the curing agent of the present invention is within the range, a cured product having better mechanical strength at high temperature and better long-term heat resistance can be obtained. The lower limit of the amount of the curing agent of the present invention is more preferably 70 parts by weight and the upper limit thereof is more preferably 400 parts by weight.

For purposes such as improving the processability in the uncured state, the curable resin composition of the present invention may contain a different curing agent in addition to the curing agent of the present invention without inhibiting the purposes of the present invention.

Examples of the different curing agent include phenol curing agents, thiol curing agents, amine curing agents, acid anhydride curing agents, cyanate curing agents, and active ester curing agent. Preferred among them are phenol curing agents, acid anhydride curing agents, cyanate curing agents, and active ester curing agents.

When the curable resin composition of the present invention contains the different curing agent, the upper limit of the proportion of the different curing agent in the total amount of the curing agents is preferably 70% by weight, more preferably 50% by weight, still more preferably 30% by weight.

The curable resin composition of the present invention contains a curable resin.

Examples of the curable resin include epoxy resins, acrylic resins, phenolic resins, cyanate resins, isocyanate resins, maleimide resins, benzoxazine resins, silicone resins, fluororesins, polyimide resins, and phenoxy resins. In particular, epoxy resins are suitably used.

Examples of the epoxy resin include bisphenol A epoxy resins, bisphenol F epoxy resins, bisphenol E epoxy resins, bisphenol S epoxy resins, 2,2'-diallylbisphenol A epoxy resins, hydrogenated bisphenol epoxy resins, propylene oxide-added bisphenol A epoxy resins, resorcinol epoxy resins, biphenyl epoxy resins, sulfide epoxy resins, diphenyl ether epoxy resins, dicyclopentadiene epoxy resins, naphthalene epoxy resins, fluorene epoxy resins, naphtylene ether epoxy resins, phenol novolac epoxy resins, ortho-cresol novolac epoxy resins, dicyclopentadiene novolac epoxy resins, biphenyl novolac epoxy resins, naphthalene phenol novolac epoxy resins, glycidylamine epoxy resins, alkyl polyol epoxy resins, rubber-modified epoxy resins, and glycidyl ester compounds. Preferred among them are bisphenol A epoxy resins, bisphenol F epoxy resins, bisphenol E epoxy resins, and resorcinol epoxy resins because they have low viscosity that makes it easy to adjust the processability of the resulting curable resin composition at room temperature.

The curable resin composition of the present invention may contain a curing accelerator. The curing accelerator contained in the curable resin composition can shorten the curing time and improve the productivity.

Examples of the curing accelerator include imidazole curing accelerators, tertiary amine curing accelerators, phosphine curing accelerators, photobase generators, and sulfonium salt curing accelerators.

The lower limit of the amount of the curing accelerator is preferably 0.01 parts by weight and the upper limit thereof is preferably 10 parts by weight relative to 100 parts by weight of the curable resin. When the amount of the curing accelerator is within the range, the effect of shortening the curing time can be better while excellent adhesiveness and the like are maintained. The lower limit of the amount of the curing accelerator is more preferably 0.05 parts by weight and the upper limit thereof is more preferably 5 parts by weight.

The curable resin composition of the present invention may contain an organic filler for purposes such as stress relaxation or imparting toughness.

Any organic filler may be used. Examples thereof include silicone rubber particles, acrylic rubber particles, urethane rubber particles, polyamide particles, polyamideimide particles, polyimide particles, benzoguanamine particles, and any of these particles with a core-shell structure. Preferred among them are polyamide particles, polyamideimide particles, and polyimide particles.

The lower limit of the amount of the organic filler is preferably 10 parts by weight and the upper limit thereof is preferably 500 parts by weight relative to 100 parts by weight of the curable resin. When the amount of the organic filler is within the range, the resulting cured product has better toughness while maintaining excellent adhesiveness and the like. The lower limit of the amount of the organic filler is more preferably 30 parts by weight and the upper limit thereof is more preferably 400 parts by weight.

The curable resin composition of the present invention may contain an inorganic filler for purposes such as lowering the linear expansion coefficient after curing to reduce warping, or improving the adhesion reliability. The inorganic filler may also be used as a fluidity modifier.

Examples of the inorganic filler include silica such as fumed silica and colloidal silica, alumina, aluminum nitride, boron nitride, silicon nitride, glass powder, glass frit, glass fiber, carbon fiber, and inorganic ion exchangers.

The lower limit of the amount of the inorganic filler is preferably 10 parts by weight and the upper limit thereof is preferably 500 parts by weight relative to 100 parts by weight of the curable resin. When the amount of the inorganic filler is within the range, the effect of improving the adhesion reliability and the like can be better while excellent adhesiveness and the like are maintained. The lower limit of the amount of the inorganic filler is more preferably 30 parts by weight and the upper limit thereof is more preferably 400 parts by weight.

The curable resin composition of the present invention may contain a polymer compound without inhibiting the purposes of the present invention. The polymer compound serves as a film-forming component.

The polymer compound may contain a reactive functional group.

Examples of the reactive functional group include an amino group, a urethane group, an imide group, a hydroxy group, a carboxy group, and an epoxy group.

The polymer compound may or may not form a phase separation structure in the cured product. When the polymer compound does not form a phase separation structure in the cured product, the polymer compound is preferably a polymer compound having an epoxy group as the reactive functional group because better mechanical strength at high temperature, better long-term heat resistance, and better moisture resistance can be achieved.

The curable resin composition of the present invention may contain a solvent from the standpoint of coating properties or the like.

The solvent is preferably a nonpolar solvent having a boiling point of 120° C. or lower or an aprotic polar solvent having a boiling point of 120° C. or lower from the standpoint of the coating properties, the storage stability, and the like.

Examples of the nonpolar solvent having a boiling point of 120° C. or lower or the aprotic polar solvent having a boiling point of 120° C. or lower include ketone solvents, ester solvents, hydrocarbon solvents, halogen solvents, ether solvents, and nitrogen-containing solvents.

Examples of the ketone solvent include acetone, methyl ethyl ketone, and methyl isobutyl ketone.

Examples of the ester solvent include methyl acetate, ethyl acetate, isobutyl acetate.

Examples of the hydrocarbon solvent include benzene, toluene, normal hexane, isohexane, cyclohexane, methylcyclohexane, and normal heptane.

Examples of the halogen solvent include dichloromethane, chloroform, and trichloroethylene.

Examples of the ether solvent include diethyl ether, tetrahydrofuran, 1,4-dioxane, and 1,3-dioxolane.

Examples of the nitrogen-containing solvent include acetonitrile.

From the standpoint of the handleability, the solubility of the imide oligomer, and the like, the solvent is preferably at least one selected from the group consisting of a ketone solvent having a boiling point of 60° C. or higher, an ester solvent having a boiling point of 60° C. or higher, and an ether solvent having a boiling point of 60° C. or higher. Examples of such solvents include methyl ethyl ketone, methyl isobutyl ketone, ethyl acetate, isobutyl acetate, 1,4-dioxane, 1,3-dioxolane, and tetrahydrofuran.

The "boiling point" is a value measured at 101 kPa or a value converted to correspond to 101 kPa with a boiling point conversion chart, for example.

The lower limit of the amount of the solvent in the curable resin composition of the present invention is preferably 20% by weight and the upper limit thereof is preferably 90% by weight. When the amount of the solvent is within the range, the curable resin composition of the present invention has better coating properties and the like. The lower limit of the amount of the solvent is more preferably 30% by weight and the upper limit thereof is more preferably 80% by weight.

The curable resin composition of the present invention may contain a reactive diluent without inhibiting the purposes of the present invention.

The reactive diluent is preferably a reactive diluent having two or more reactive functional groups in one molecule from the standpoint of the adhesion reliability.

The curable resin composition of the present invention may further contain additives such as a solvent, a coupling agent, a dispersant, a storage stabilizer, a bleeding preventing agent, a flux, and an organic or inorganic flame retardant.

The curable resin composition of the present invention may be produced by a method including mixing the curable resin, the curing agent of the present invention, and optional ingredients such as a different curing agent and a curing accelerator using a mixer such as a homogenizing disperser, a universal mixer, a Banbury mixer, or a kneader.

A curable resin composition film containing the curable resin composition of the present invention can be obtained by applying the curable resin composition of the present invention to a substrate film and drying the curable resin composition.

A cured product of the curable resin composition of the present invention preferably has a glass transition temperature of 150° C. or higher, more preferably 160° C. or higher from the standpoint of the mechanical strength and the long-term heat resistance.

The glass transition temperature can be determined as the peak temperature on a tan δ curve obtained by analyzing a cured product having a thickness of 400 μm using a dynamic viscoelasticity measuring apparatus from 0° C. to 300° C. at a temperature increase rate of 10° C./min, a frequency of 10 Hz, and a chuck interval of 24 mm. The cured product with which the glass transition temperature is measured can be obtained by heating the above curable resin composition film at 190° C. for 30 minutes. The dynamic viscoelasticity measuring apparatus may be, for example, RHEOVIBRON Automatic Dynamic Viscoelastometer DDV-GP series (available from A & D Company, Limited).

A cured product of the curable resin composition of the present invention preferably has a weight reduction ratio at 330° C. of less than 2.5%, more preferably less than 2.0% from the standpoint of the thermal decomposition resistance.

The weight reduction ratio can be determined by thermogravimetry of the curable resin composition film using a device for thermogravimetry from 30° C. to 400° C. at a temperature increase rate of 10° C./min. The weight reduction ratio is determined as the proportion of the weight that is reduced before the temperature reaches 330° C. The device for thermogravimetry may be EXTEAR TG/DTA6200 (available from SII NanoTechnology Inc.), for example.

For the curable resin composition of the present invention to be suitably used in adhesives for coverlays of flexible print circuit substrates and the like, the curable resin composition preferably has adhesive force to polyimide of 3.4 N/cm or more, more preferably 6 N/cm or more.

The adhesive force to polyimide can be measured by a T-peel test of a specimen having a width of 1 cm using a tensile tester at a peeling speed of 20 mm/min. The specimen is obtained by stacking polyimide films, each having a thickness of 50 μm, on both surfaces of the curable resin composition film having a thickness of 20 μm and heating the stack at 190° C. for one hour. The polyimide may be Kapton 200H (available from Du Pont-Toray Co., Ltd., surface roughness: 0.03 to 0.07 μm). The tensile tester may be UCT-500 (available from Orientec Co., Ltd.), for example.

The curable resin composition of the present invention can be used in a wide range of applications, and can be particularly suitably used in electronic material applications that require high heat resistance. For example, the curable resin composition can be used in: die attach agents in applications such as aircraft or in-vehicle electronic control units (ECUs), power devices containing SiC or GaN; adhesives for power overlay packaging; curable resin compositions for print wiring boards; adhesives for coverlays of flexible print circuit substrates; copper clad laminates; adhesives for semiconductor bonding; interlayer insulating films; pre-pregs; sealants for LEDs; and curable resin compositions for structure materials; or the like. In particular, the curable resin composition is suitably used in adhesive applications.

Advantageous Effects of Invention

The present invention can provide an imide oligomer usable in a cured product that has a high glass transition temperature after curing and is excellent in thermal decomposition resistance, adhesiveness, and long-term heat resistance. The present invention also can provide a curable resin composition and an imide oligomer composition each containing the imide oligomer, an adhesive containing the curable resin composition, and a curing agent containing the imide oligomer composition.

DESCRIPTION OF EMBODIMENTS

Embodiments of the present invention are specifically described in the following with reference to, but not limited to, examples.

SYNTHESIS EXAMPLE 1

Preparation of Imide Oligomer Composition A

An amount of 34.5 parts by weight of 1,3-bis(2-(4-aminophenyl)-2-propyl)benzene (available from Mitsui Fine Chemicals, Inc., "Bisaniline M") was dissolved in 400 parts by weight of N-methylpyrrolidone (available from Wako Pure Chemical Industries, Ltd., "NMP"). To the obtained solution was added 62.0 parts by weight of 3,4'-oxydiphthalic dianhydride (available from Tokyo Chemical Industry Co., Ltd., "3,4'-ODPA"), followed by stirring at 25° C. for two hours to cause reaction to give an amic acid oligomer solution. N-Methylpyrrolidone was removed from the obtained amic acid oligomer solution under reduced pressure, followed by heating at 300° C. for two hours to give an imide oligomer composition A (imidization ratio: 92%).

$^1$H-NMR, GPC, and FT-IR analyses showed that the imide oligomer composition A contained an imide oligomer having a structure of the above formula (1-1) (A is a group of the following formula (13) and B is a group of the following formula (14)). The imide oligomer having a structure of the formula (1-1) had a number average molecular weight of 1,380. The analyses further showed that the imide oligomer composition A contained an imide oligomer of the above formula (4-1) (A is a group of the following formula (13) and B is a group of the following formula (14)) as the imide oligomer having a structure of the formula (1-1).

[Chem. 13]

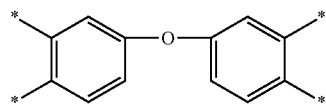
(13)

In the formula (13), * is a binding site.

[Chem. 14]

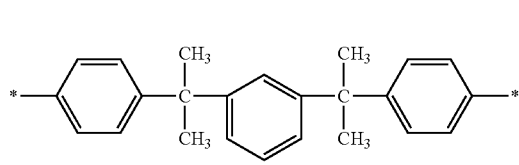
(14)

In the formula (14), * is a binding site.

SYNTHESIS EXAMPLE 2

Preparation of Imide Oligomer Composition B

An imide oligomer composition B (imidization ratio: 92%) was obtained as in Synthesis Example 1 except that 34.5 parts by weight of 1,3-bis(2-(4-aminophenyl)-2-propyl)benzene was changed to 34.5 parts by weight of 1,4-bis(2-(4-aminophenyl)-2-propyl)benzene (available from Mitsui Fine Chemicals, Inc., "Bisaniline P").

$^1$H-NMR, GPC, and FT-IR analyses showed that the imide oligomer composition B contained an imide oligomer having a structure of the above formula (1-1) (A is a group of the above formula (13) and B is a group of the following formula (15)). The imide oligomer having a structure of the formula (1-1) had a number average molecular weight of 1,390. The analyses further showed that the imide oligomer composition B contained an imide oligomer of the above formula (4-1) (A is a group of the above formula (13) and B is a group of the following formula (15)) as the imide oligomer having a structure of the formula (1-1).

[Chem. 15]

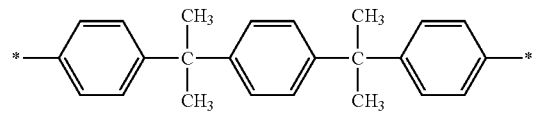
(15)

In the formula (15), * is a binding site.

SYNTHESIS EXAMPLE 3

Preparation of Imide Oligomer Composition C

An imide oligomer composition C (imidization ratio: 91%) was obtained as in Synthesis Example 1 except that 34.5 parts by weight of 1,3-bis(2-(4-aminophenyl)-2-propyl)benzene was changed to 29.2 parts by weight of 1,3-bis(3-aminophenoxy)benzene (available from Mitsui Fine Chemicals, Inc., "APB-N").

$^1$H-NMR, GPC, and FT-IR analyses showed that the imide oligomer composition C contained an imide oligomer having a structure of the above formula (1-1) (A is a group of the above formula (13) and B is a group of the following formula (16)). The imide oligomer composition C had a number average molecular weight of 1,310. The analyses further showed that the imide oligomer composition C contained an imide oligomer of the above formula (4-1) (A is a group of the above formula (13) and B is a group of the following formula (16)) as the imide oligomer having a structure of the formula (1-1).

[Chem. 16]

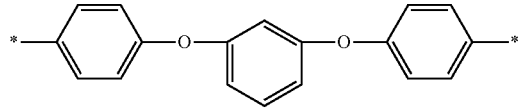
(16)

In the formula (16), * is a binding site.

SYNTHESIS EXAMPLE 4

Preparation of Imide Oligomer Composition D

An imide oligomer composition D (imidization ratio: 93%) was obtained as in Synthesis Example 1 except that 62.0 parts by weight of 3,4'-oxydiphthalic dianhydride was changed to 104.1 parts by weight of 4,4'-(4,4'-isopropylidenediphenoxy)diphthalic anhydride (available from Tokyo Chemical Industry Co., Ltd.).

$^1$H-NMR, GPC, and FT-IR analyses showed that the imide oligomer composition D contained an imide oligomer having a structure of the above formula (1-1) (A is a group of the following formula (17) and B is a group of the above formula (14)). The imide oligomer having a structure of the formula (1-1) had a number average molecular weight of 2,020. The analyses further showed that the imide oligomer composition D contained an imide oligomer of the above formula (4-1) (A is a group of the following formula (17) and B is a group of the above formula (14)) as the imide oligomer having a structure of the formula (1-1).

[Chem. 17]

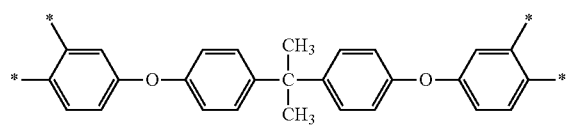

(17)

In the formula (17), * is a binding site.

SYNTHESIS EXAMPLE 5

Preparation of Imide Oligomer Composition E

An imide oligomer composition E (imidization ratio: 91%) was obtained as in Synthesis Example 4 except that the amount of 4,4'-(4,4'-isopropylidenediphenoxy)diphthalic anhydride added was changed to 98.9 parts by weight.

$^1$H-NMR, GPC, and FT-IR analyses showed that the imide oligomer composition E contained an imide oligomer having a structure of the above formula (1-1) (A is a group of the above formula (17) and B is a group of the above formula (14)). The imide oligomer having a structure of the formula (1-1) had a number average molecular weight of 2,520. The analyses further showed that the imide oligomer composition E contained an imide oligomer of the above formula (4-1) (A is a group of the formula (17) and B is a group of the above formula (14)) as the imide oligomer having a structure of the formula (1-1).

SYNTHESIS EXAMPLE 6

Preparation of Imide Oligomer Composition F)

An imide oligomer composition F (imidization ratio: 92%) was obtained as in Synthesis Example 1 except that the amount of 3,4'-oxydiphthalic dianhydride added was changed to 65.1 parts by weight.

$^1$H-NMR, GPC, and FT-IR analyses showed that the imide oligomer composition F contained an imide oligomer having a structure of the above formula (1-1) (A is a group of the above formula (13) and B is a group of the above formula (14)). The imide oligomer having a structure of the formula (1-1) had a number average molecular weight of 1,220. The analyses further showed that the imide oligomer composition F contained an imide oligomer of the above formula (4-1) (A is a group of the above formula (13) and B is a group of the above formula (14)) as the imide oligomer having a structure of the formula (1-1).

SYNTHESIS EXAMPLE 7

Preparation of Imide Oligomer Composition G

An amount of 34.5 parts by weight of 1,3-bis(2-(4-aminophenyl)-2-propyl)benzene (available from Mitsui Fine Chemicals, Inc., "Bisaniline M") was dissolved in 400 parts by weight of N-methylpyrrolidone (available from Wako Pure Chemical Industries, Ltd., "NMP"). To the obtained solution was added 62.0 parts by weight of 3,4'-oxydiphthalic dianhydride (available from Tokyo Chemical Industry Co., Ltd., "3,4'-ODPA"), followed by stirring at 25° C. for two hours to cause reaction to give an amic acid oligomer solution. The amic acid oligomer solution was heated at 180° C. for three hours in N-methylpyrrolidone while removing with a Dean-Stark tube the water generated from imidization, and then N-methylpyrrolidone was removed under reduced pressure. Thus, an imide oligomer composition G (imidization ratio: 23%) was obtained.

$^1$H-NMR, GPC, and FT-IR analyses showed that the imide oligomer composition G contained an imide oligomer having a structure of the above formula (1-1) (A is a group of the above formula (13) and B is a group of the above formula (14)). The imide oligomer having a structure of the formula (1-1) had a number average molecular weight of 1,400. The analyses further showed that the imide oligomer composition G contained an imide oligomer of the above formula (4-1) (A is a group of the above formula (13) and B is a group of the above formula (14)) as the imide oligomer having a structure of the formula (1-1).

SYNTHESIS EXAMPLE 8

Preparation of Imide Oligomer Composition H

An imide oligomer composition H (imidization ratio: 91%) was obtained as in Synthesis Example 4 except that the amount of 4,4'-(4,4'-isopropylidenediphenoxy)diphthalic anhydride added was changed to 78.1 parts by weight.

$^1$H-NMR, GPC, and FT-IR analyses showed that the imide oligomer composition H contained an imide oligomer having a structure of the above formula (1-1) (A is a group of the above formula (17) and B is a group of the above formula (14)). The imide oligomer having a structure of the formula (1-1) had a number average molecular weight of 4,200.

SYNTHESIS EXAMPLE 9

Preparation of Imide Oligomer Composition I

An imide oligomer composition I (imidization ratio: 91%) was obtained as in Synthesis Example 1 except that the amount of 3,4'-oxydiphthalic dianhydride added was changed to 71.4 parts by weight.

$^1$H-NMR, GPC, and FT-IR analyses showed that the imide oligomer composition I contained an imide oligomer having a structure of the above formula (1-1) (A is a group of the above formula (13) and B is a group of the above formula (14)). The imide oligomer having a structure of the formula (1-1) had a number average molecular weight of 830.

SYNTHESIS EXAMPLE 10

Preparation of Imide Oligomer Composition J

An imide oligomer composition J (imidization ratio: 25%) was obtained as in Synthesis Example 7 except that the amount of 3,4'-oxydiphthalic dianhydride added was changed to 46.5 parts by weight.

$^1$H-NMR, GPC, and FT-IR analyses showed that the imide oligomer composition J contained an imide oligomer having a structure of the above formula (1-1) (A is a group of the above formula (13) and B is a group of the above formula (14)). The imide oligomer having a structure of the formula (1-1) had a number average molecular weight of 4,240.

SYNTHESIS EXAMPLE 11

Preparation of Imide Oligomer Composition K

An imide oligomer composition K (imidization ratio: 25%) was obtained as in Synthesis Example 7 except that the amount of 3,4'-oxydiphthalic dianhydride added was changed to 71.4 parts by weight.

$^1$H-NMR, GPC, and FT-IR analyses showed that the imide oligomer composition K contained an imide oligomer having a structure of the above formula (1-1) (A is a group of the above formula (13) and B is a group of the above formula (14)). The imide oligomer having a structure of the formula (1-1) had a number average molecular weight of 850.

SYNTHESIS EXAMPLE 12

Preparation of Imide Oligomer Composition L

The imide oligomer composition A obtained in Synthesis Example 1 in an amount of 70 parts by weight and the imide oligomer composition G obtained in Synthesis Example 7 in an amount of 30 parts by weight of were mixed in 500 parts by weight of methyl ethyl ketone, followed by removal of the methyl ethyl ketone under reduced pressure to give an imide oligomer composition L (imidization ratio: 71%).

$^1$H-NMR, GPC, and FT-IR analyses showed that the imide oligomer composition L contained an imide oligomer having a structure of the above formula (1-1) (A is a group of the above formula (13) and B is a group of the above formula (14)). The imide oligomer having a structure of the formula (1-1) had a number average molecular weight of 1,390. The analyses further showed that the imide oligomer composition L contained an imide oligomer of the above formula (4-1) (A is a group of the above formula (13) and B is a group of the above formula (14)) as the imide oligomer having a structure of the formula (1-1).

SYNTHESIS EXAMPLE 13

Preparation of Imide Oligomer Composition M

An amount of 24.6 parts by weight of 5-amino-o-cresol was dissolved in 400 parts by weight of N-methylpyrrolidone (available from Wako Pure Chemical Industries, Ltd., "NMP"). To the obtained solution was added 31.0 parts by weight of 3,4'-oxydiphthalic dianhydride (available from Tokyo Chemical Industry Co., Ltd., "3,4'-ODPA"), followed by stirring at 25° C. for two hours to cause reaction to give an amic acid oligomer solution. N-Methylpyrrolidone was removed from the obtained amic acid oligomer solution under reduced pressure, followed by heating at 300° C. for two hours to give an imide oligomer composition M (imidization ratio: 91%).

$^1$H-NMR, GPC, and FT-IR analyses showed that the imide oligomer composition M contained an imide oligomer having a structure of the above formula (1-2) (A is a group of the above formula (13) and Ar is a group of the following formula (18)). The imide oligomer having a structure of the formula (1-2) had a number average molecular weight of 650. The analyses further showed that the imide oligomer composition M contained an imide oligomer of the above formula (5-1) (A is a group of the above formula (13) and R is a methyl group) as the imide oligomer having a structure of the formula (1-2).

[Chem. 18]

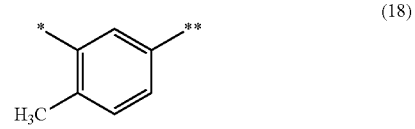

(18)

In the formula (18), * and ** are each a binding site, and * is a binding site to the hydroxy group in the formula (1-2).

SYNTHESIS EXAMPLE 14

Preparation of Imide Oligomer Composition N

An imide oligomer composition N (imidization ratio: 90%) was obtained as in Synthesis Example 13 except that 24.6 parts by weight of 5-amino-o-cresol was changed to 21.8 parts by weight of 3-aminophenol.

$^1$H-NMR, GPC, and FT-IR analyses showed that the imide oligomer composition N contained an imide oligomer having a structure of the above formula (1-2) (A is a group of the above formula (13) and Ar is a group of the following formula (19)). The imide oligomer having a structure of the formula (1-2) had a number average molecular weight of 630. The analyses further showed that the imide oligomer composition N contained an imide oligomer of the above formula (5-1) (A is a group of the above formula (13) and R is a hydrogen atom) as the imide oligomer having a structure of the formula (1-2).

[Chem. 19]

(19)

In the formula (19), * is a binding site.

SYNTHESIS EXAMPLE 15

Preparation of Imide Oligomer Composition O

An imide oligomer composition O (imidization ratio: 92%) was obtained as in Synthesis Example 13 except that 31.0 parts by weight of 3,4'-oxyphthalic dianhydride was changed to 52.0 parts by weight of 4,4'-(4,4'-isopropylidenediphenoxy)diphthalic anhydride.

$^1$H-NMR, GPC, and FT-IR analyses showed that the imide oligomer composition O contained an imide oligomer having a structure of the above formula (1-2) (A is a group of the above formula (17) and Ar is a group of the above formula (18)). The imide oligomer having a structure of the formula (1-2) had a number average molecular weight of 910. The analyses further showed that the imide oligomer composition O contained an imide oligomer of the above formula (5-1) (A is a group of the above formula (17) and R is a methyl group) as the imide oligomer having a structure of the formula (1-2).

SYNTHESIS EXAMPLE 16

Preparation of Imide Oligomer Composition P

An imide oligomer composition P (imidization ratio: 91%) was obtained as in Synthesis Example 13 except that 31.0 parts by weight of 3,4'-oxydiphthalic dianhydrid was changed to 135.0 parts by weight of the imide oligomer composition E obtained in Synthesis Example 5.

$^1$H-NMR, GPC, and FT-IR analyses showed that the imide oligomer composition P contained an imide oligomer having a structure of the above formula (1-2) (A is a group of the above formula (17) and Ar is a group of the above formula (18). The imide oligomer having a structure of the formula (1-2) had a number average molecular weight of 2,960. The analyses further showed that the imide oligomer composition P contained an imide oligomer of the above formula (5-3) (A is a group of the above formula (17), B is a group of the above formula (14), and R is a methyl group) as the imide oligomer having a structure of the formula (1-2).

SYNTHESIS EXAMPLE 17

Preparation of Imide Oligomer Composition Q

An imide oligomer composition Q (imidization ratio: 91%) was obtained as in Synthesis Example 13 except that the amount of 5-amino-o-cresol added was changed to 25.9 parts by weight.

$^1$H-NMR, GPC, and FT-IR analyses showed that the imide oligomer composition Q contained an imide oligomer having a structure of the above formula (1-2) (A is a group of the above formula (13) and Ar is a group of the above formula (18)). The imide oligomer having a structure of the formula (1-2) had a number average molecular weight of 590. The analyses further showed that the imide oligomer composition Q contained an imide oligomer of the above formula (5-1) (A is a group of the above formula (13) and R is a methyl group) as the imide oligomer having a structure of the formula (1-2).

SYNTHESIS EXAMPLE 18

Preparation of Imide Oligomer Composition R

An amount of 24.6 parts by weight of 5-amino-o-cresol was dissolved in 400 parts by weight of N-methylpyrrolidone (available from Wako Pure Chemical Industries, Ltd., "NMP"). To the obtained solution was added 31.0 parts by weight of 3,4'-oxydiphthalic dianhydride (available from Tokyo Chemical Industry Co., Ltd., "3,4'-ODPA"), followed by stirring at 25° C. for two hours to cause reaction to give an amic acid oligomer solution. The amic acid oligomer solution was heated at 180° C. for three hours in N-methylpyrrolidone while removing with a Dean-Stark tube the water generated from imidization, and then N-methylpyrrolidone was removed under reduced pressure. Thus, an imide oligomer composition R (imidization ratio: 25%) was obtained.

$^1$H-NMR, GPC, and FT-IR analyses showed that the imide oligomer composition R contained an imide oligomer having a structure of the above formula (1-2) (A is a group of the above formula (13) and Ar is a group of the above formula (18)). The imide oligomer having a structure of the formula (1-2) had a number average molecular weight of 680. The analyses further showed that the imide oligomer composition R contained an imide oligomer of the above formula (5-1) (A is a group of the above formula (13) and R is a methyl group) as the imide oligomer having a structure of the formula (1-2).

SYNTHESIS EXAMPLE 19

Preparation of Imide Oligomer Composition S

An imide oligomer composition S (imidization ratio: 90%) was obtained as in Synthesis Example 13 except that 31.0 parts by weight of 3,4'-oxydiphthalic dianhydride was changed to 180.0 parts by weight of the imide oligomer composition H obtained in Synthesis Example 8.

$^1$H-NMR, GPC, and FT-IR analyses showed that the imide oligomer composition S contained an imide oligomer having a structure of the above formula (1-2) (A is a group of the above formula (17) and Ar is a group of the above formula (18)). The imide oligomer having a structure of the formula (1-2) had a number average molecular weight of 4,610.

SYNTHESIS EXAMPLE 20

Preparation of Imide Oligomer Composition T

An imide oligomer composition T (imidization ratio: 90%) was obtained as in Synthesis Example 13 except that the amount of the 5-amino-o-cresol added was changed to 26.9 parts by weight.

$^1$H-NMR, GPC, and FT-IR analyses showed that the imide oligomer composition T contained an imide oligomer having a structure of the above formula (1-2) (A is a group of the above formula (13) and Ar is a group of the above formula (18)). The imide oligomer having a structure of the formula (1-2) had a number average molecular weight of 490.

SYNTHESIS EXAMPLE 21

Preparation of Imide Oligomer Composition U

An imide oligomer composition U (imidization ratio: 26%) was obtained as in Synthesis Example 18 except that 31.0 parts by weight of 3,4'-oxydiphthalic dianhydride was changed to 180.0 parts by weight of the imide oligomer composition H obtained in Synthesis Example 8.

$^1$H-NMR, GPC, and FT-IR analyses showed that the imide oligomer composition U contained an imide oligomer having a structure of the above formula (1-2) (A is a group of the above formula (17) and Ar is a group of the above formula (18)). The imide oligomer having a structure of the formula (1-2) had a number average molecular weight of 4,650.

SYNTHESIS EXAMPLE 22

Preparation of Imide Oligomer Composition V

An imide oligomer composition V (imidization ratio: 23%) was obtained as in Synthesis Example 18 except that the amount of 5-amino-o-cresol added was changed to 26.9 parts by weight.

$^1$H-NMR, GPC, and FT-IR analyses showed that the imide oligomer composition V contained an imide oligomer having a structure of the above formula (1-2) (A is a group of the above formula (13) and Ar is a group of the above formula (18)). The imide oligomer having a structure of the formula (1-2) had a number average molecular weight of 520.

SYNTHESIS EXAMPLE 23

Preparation of Imide Oligomer Composition W

The imide oligomer composition M obtained in Synthesis Example 13 in an amount of 70 parts by weight and the imide oligomer composition R obtained in Synthesis Example 18 in an amount of 30 parts by weight of were mixed in 500 parts by weight of methyl ethyl ketone, followed by removal of the methyl ethyl ketone under reduced pressure to give an imide oligomer composition W (imidization ratio: 71%).

$^1$H-NMR, GPC, and FT-IR analyses showed that the imide oligomer composition W contained an imide oligomer having a structure of the above formula (1-2) (A is a group of the above formula (13) and Ar is a group of the above formula (18)). The imide oligomer having a structure of the formula (1-2) had a number average molecular weight of 660. The analyses further showed that the imide oligomer composition W contained an imide oligomer of the above formula (5-1) (A is a group of the above formula (13) and R is a methyl group) as the imide oligomer having a structure of the formula (1-2).

(Solubility)

Each of the imide oligomer compositions obtained in the synthesis examples was dissolved in methyl ethyl ketone (MEK), tetrahydrofuran (THF), and a bisphenol F epoxy resin (available from DIC Corporation, "EPICLON EXA-830CRP"). The solubility was evaluated as "Good (○)" when the amount of the imide oligomer composition dissolved in the MEK, THF, and bisphenol F epoxy resin, 10 g each, was 3 g or more, "Fair (Δ)" when the amount was 1 g or more and less than 3 g, and "Poor (×)" when the amount was less than 1 g.

For the MEK and THF, a predetermined amount of the imide oligomer composition was added to 10 g of the MEK or THF, followed by stirring using a planetary stirrer. The solubility at 25° C. was then evaluated. For EXA-830CRP, a predetermined amount of the imide oligomer composition was added to 10 g of EXA-830CRP, followed by stirring for one hour with heating at 150° C., then followed by cooling. The solubility at 25° C. was then evaluated.

Table 1 shows the results.

(Melting Point)

The melting point of each of the imide oligomer compositions obtained in the synthesis examples was measured as the endothermic peak temperature using a differential scanning calorimeter (EXTEAR DSC6100 (available from SII NanoTechnology Inc.) at a temperature increase rate of 10° C./min.

Table 1 shows the results.

TABLE 1

| | | Imide oligomer composition | | | | | | | | | | |
|---|---|---|---|---|---|---|---|---|---|---|---|---|
| | | A | B | C | D | E | F | G | H | I | J | K | L |
| Solubility | MEK (Boiling point 80° C.) | ○ | ○ | Δ | ○ | Δ | ○ | ○ | × | × | ○ | × | ○ |
| | THF (Boiling point 66° C.) | ○ | ○ | ○ | ○ | ○ | ○ | ○ | Δ | Δ | ○ | Δ | ○ |
| | EXA-830CRP | ○ | ○ | ○ | ○ | ○ | ○ | ○ | × | × | ○ | × | ○ |
| Melting point (° C.) | | 157 | 167 | 140 | 138 | 138 | 152 | 147 | 143 | 147 | 157 | 137 | 155 |

| | | Imide oligomer composition | | | | | | | | | | |
|---|---|---|---|---|---|---|---|---|---|---|---|
| | | M | N | O | P | Q | R | S | T | U | V | W |
| Solubility | MEK (Boiling point 80° C.) | ○ | ○ | ○ | Δ | ○ | ○ | × | ○ | ○ | ○ | ○ |
| | THF (Boiling point 66° C.) | ○ | ○ | ○ | ○ | ○ | ○ | × | ○ | ○ | ○ | ○ |
| | EXA-830CRP | ○ | ○ | ○ | Δ | ○ | ○ | × | ○ | ○ | ○ | ○ |
| Melting point (° C.) | | 160 | 149 | 140 | 183 | 155 | 150 | 193 | 150 | 193 | 150 | 155 |

EXAMPLES 1 TO 24 AND COMPARATIVE EXAMPLES 1 to 10

Curable resin compositions of Examples 1 to 24 and Comparative Examples 1 to 10 were prepared by mixing materials according to the formulations shown in Tables 2 to 8.

<Evaluation>

The curable resin compositions obtained in the examples and the comparative examples were evaluated as follows. Tables 2 to 8 show the results.

(Weight Reduction Ratio at 330° C.)

Each of the curable resin compositions obtained in the examples and the comparative examples was applied to a substrate film and dried to give a curable resin composition film.

The weight reduction ratio (%) at 330° C. of the curable resin composition film was measured using a device for thermogravimetry (available from SII NanoTechnology Inc., "EXTEAR TG/DTA6200") by increasing the temperature from 30° C. to 400° C. at 10° C./min.

(Glass Transition Temperature)

Each of the curable resin compositions obtained in the examples and the comparative examples was applied to a substrate film and dried to give a curable resin composition film. Curable resin composition films obtained in this manner were stacked and heated at 190° C. for 30 minutes to be cured, whereby a cured product having a thickness of 400 µm was obtained. The glass transition temperature of the obtained cured product was determined as the peak temperature on a tan δ curve obtained when the temperature was increased from 0° C. to 300° C. using a dynamic viscoelasticity measuring apparatus (available from A & D Company, Limited, "RHEOVIBRON DDV-25GP") at a temperature increase rate of 10° C./min, a frequency of 10 Hz, and a chuck interval of 24 mm. A glass transition temperature of 150° C. or higher was evaluated as "Good (○)". A glass transition temperature of 130° C. or higher and lower than 150° C. was evaluated as "Fair (Δ)". A glass transition temperature of lower than 130° C. was "Poor (×)".

(Long-Term Heat Resistance)

Each of the curable resin compositions obtained in the examples and the comparative examples was applied to a substrate film and dried to give a curable resin composition film. Polyimide films (available from Du Pont-Toray Co., Ltd., "Kapton V") each having a thickness of 20 µm were stacked on both surfaces of the obtained curable resin composition film (thickness: 20 µm) and heated at 190° C. for one hour to be cured, followed by heating at 175° C. for 1,000 hours. The laminate of the curable resin composition film and the polyimide films after the heat treatment was placed in an arch shape along a cylinder having a diameter of 5 mm or 3 mm at room temperature. The state of the laminate of the curable resin composition film and the polyimide films was then visually observed.

The long-term heat resistance was evaluated as "Good (○)" in the case where no crack or fracture was observed at all when the laminate was placed in an arch shape along the cylinder having a diameter of 3 mm, "Fair (Δ)" in the case where no crack or fracture was observed when the laminate was placed in an arch shape along the cylinder having a diameter of 5 mm, but a crack or a fracture was observed when it was placed in an arch shape along the cylinder having a diameter of 3 mm, and "Poor (×)" in the case where a crack or fracture was observed when the laminate was placed in an arch shape along the cylinder having a diameter of 5 mm.

(Adhesiveness)

Each of the curable resin compositions obtained in the examples and the comparative examples was applied to a substrate PET film to a thickness of about 20 µm and dried to give a curable resin composition film. The PET film was removed from the obtained curable resin composition film. Polyimide films (available from Du Pont-Toray Co., Ltd., "Kapton 200H") each having a thickness of 50 µm were bonded to both surfaces of the adhesive layer using a laminator with heating at 80° C. The laminate was hot pressed under the conditions of 190° C., 3 MPa, and one hour to cure the adhesive layer, and then cut to a specimen having a width of 1 cm.

The obtained specimen was subjected to a T-peel test using a tensile tester (available from Orientec Co., Ltd., "UCT-500") at a peeling speed of 20 ram/min to measure the adhesion force.

The adhesiveness was evaluated as "Good (○)" in the case where the adhesion force was 6 N/cm or more, "Fair (Δ)" in the case where the adhesion force was 3.4 N/cm or more and less than 6 N/cm, and "Poor (×)" in the case where the adhesion force was less than 3.4 N/cm.

TABLE 2

| | | | Examples | | | | | | |
|---|---|---|---|---|---|---|---|---|---|
| | | | 1 | 2 | 3 | 4 | 5 | 6 | 7 |
| Composition (parts by weight) | Curable resin | Bisphenol F epoxy resin (available from DIC Corporation, "EPICLON EXA-830CRP") | 100 | 100 | 100 | 100 | 100 | 100 | 100 |
| | Curing agent | Imide oligomer composition A (imidizaion ratio 92%, containing an oligomer having a structure of formula (1-1) and a number average molecular weight of 1380) | 145 | — | — | — | — | — | — |
| | | Imide oligomer composition B (imidizaion ratio 92%, containing an oligomer having a structure of formula (1-1) and a number average molecular weight of 1390) | — | 145 | — | — | — | — | — |
| | | Imide oligomer composition C (imidizaion ratio 91%, containing an oligomer having a structure of formula (1-1) and a number average molecular weight of 1310) | — | — | 137 | — | — | — | — |
| | | Imide oligomer composition D (imidizaion ratio 93%, containing an oligomer having a structure of formula (1-1) and a number average molecular weight of 2020) | — | — | — | 211 | — | — | — |
| | | Imide oligomer composition E (imidizaion ratio 91%, containing an oligomer having a structure of formula (1-1) and a number average molecular weight of 2520) | — | — | — | — | 222 | — | — |
| | | Imide oligomer composition F (imidizaion ratio 92%, containing an oligomer having a structure of formula (1-1) and a number average molecular weight of 1220) | — | — | — | — | — | 132 | — |
| | | Imide oligomer composition G (imidizaion ratio 23%, containing an oligomer having a structure of formula (1-1) and a number average molecular weight of 1400) | — | — | — | — | — | — | 145 |
| | Curing accelerator | 2,4-Diamino-6-(2'-methylimidazolyl-(1'))-ethyl-s-triazine (available from Shikoku Chemicals Corporation, "2MZ-A", melting point 248° C. to 258° C.) | 5 | 5 | 5 | 5 | 5 | 5 | 5 |

TABLE 2-continued

|  |  |  | Examples | | | | | | |
|---|---|---|---|---|---|---|---|---|---|
|  |  |  | 1 | 2 | 3 | 4 | 5 | 6 | 7 |
|  | Organic filler | Polyimide particles (available from Ube Industries, Ltd., "UIP-S") | — | — | — | — | — | — | — |
|  | Fluidity modifier | Hydrophobic fumed silica (available from Tokuyama Corporation, "MT-10") | 5 | 5 | 5 | 5 | 5 | 5 | 5 |
|  | Solvent | Methyl ethyl ketone (available from Wako Pure Chemical Industries, Ltd., "MEK") | 300 | 300 | 300 | 300 | 300 | 300 | 300 |
| Evaluation |  | Weight reduction ratio at 330° C. (%) | 1.4 | 1.4 | 1.5 | 1.2 | 1.4 | 1.5 | 2.0 |
|  |  | Glass transition temperature | ○ | ○ | ○ | ○ | ○ | ○ | ○ |
|  |  | Long-term heat resistance | ○ | ○ | ○ | ○ | ○ | ○ | Δ |
|  |  | Adhesiveness | ○ | ○ | ○ | ○ | ○ | ○ | Δ |

TABLE 3

|  |  |  | Examples | | | |
|---|---|---|---|---|---|---|
|  |  |  | 8 | 9 | 10 | 11 |
| Composition (parts by weight) | Curable resin | Bisphenol F epoxy resin (available from DIC Corporation, "EPICLON EXA-830CRP") | 100 | 100 | 100 | 100 |
|  | Curing agent | Imide oligomer composition A (imidizaion ratio 92%, containing an oligomer having a structure of formula (1-1) and a number average molecular weight of 1380) | 50 | 500 | — | 101 |
|  |  | Imide oligomer composition L (imidizaion ratio 71%, containing an oligomer having a structure of formula (1-1) and a number average molecular weight of 1390) | — | — | 145 | — |
|  |  | Trialkyltetrahydrophthalic anhydride (available from Mtsubishi Chemical Corporation, "YH-306") | — | — | — | 22 |
|  | Curing accelerator | 2,4-Diamino-6-(2'-methylimidazolyl-(1'))-ethyl-s-triazine (available from Shikoku Chemicals Corporation, "2MZ-A", melting point 248° C. to 258° C.) | 5 | 5 | 5 | 5 |
|  | Organic filler | Polyimide particles (available from Ube Industries, Ltd., "UIP-S") | — | — | — | — |
|  | Fluidity modifier | Hydrophobic fumed silica (available from Tokuyama Corporation, "MT-10") | 5 | 5 | 5 | 5 |
|  | Solvent | Methyl ethyl ketone (available from Wako Pure Chemical Industries, Ltd., "MEK") | 300 | 500 | 300 | 300 |
| Evaluation |  | Weight reduction ratio at 330° C. (%) | 2.1 | 1.8 | 1.6 | 2.0 |
|  |  | Glass transition temperature | ○ | ○ | ○ | ○ |
|  |  | Long-term heat resistance | Δ | Δ | ○ | ○ |
|  |  | Adhesiveness | ○ | ○ | ○ | ○ |

TABLE 4

|  |  |  | Examples | | | | | |
|---|---|---|---|---|---|---|---|---|
|  |  |  | 12 | 13 | 14 | 15 | 16 | 17 |
| Composition (parts by weight) | Curable resin | Bisphenol F epoxy resin (available from DIC Corporation, "EPICLON EXA-830CRP") | 100 | 100 | 100 | 100 | 100 | 100 |
|  | Curing agent | Imide oligomer composition M (imidizaion ratio 91%, containing an oligomer having a structure of formula (1-2) and a number average molecular weight of 650) | 163 | — | — | — | — | — |
|  |  | Imide oligomer composition N (imidizaion ratio 90%, containing an oligomer having a structure of formula (1-2) and a number average molecular weight of 630) | — | 154 | — | — | — | — |
|  |  | Imide oligomer composition O (imidizaion ratio 92%, containing an oligomer having a structure of formula (1-2) and a number average molecular weight of 910) | — | — | 228 | — | — | — |
|  |  | Imide oligomer composition P (imidizaion ratio 91%, containing an oligomer having a structure of formula (1-2) and a number average molecular weight of 2960) | — | — | — | 487 | — | — |
|  |  | Imide oligomer composition Q (imidizaion ratio 91%, containing an oligomer having a structure of formula (1-2) and a number average molecular weight of 590) | — | — | — | — | 148 | — |
|  |  | Imide oligomer composition R (imidizaion ratio 25%, containing an oligomer having a structure of formula (1-2) and a number average molecular weight of 680) | — | — | — | — | — | 163 |

TABLE 4-continued

| | | | Examples | | | | | |
|---|---|---|---|---|---|---|---|---|
| | | | 12 | 13 | 14 | 15 | 16 | 17 |
| | Curing accelerator | 2,4-Diamino-6-(2'-methylimidazolyl-(1'))-ethyl-s-triazine (available from Shikoku Chemicals Corporation, "2MZ-A", melting point 248° C. to 258° C.) | 5 | 5 | 5 | 5 | 5 | 5 |
| | Organic filler | Polyimide particles (available from Ube Industries, Ltd., "UIP-S") | — | — | — | — | — | — |
| | Fluidity modifier | Hydrophobic fumed silica (available from Tokuyama Corporation, "MT-10") | 5 | 5 | 5 | 5 | 5 | 5 |
| | Solvent | Methyl ethyl ketone (available from Wako Pure Chemical Industries, Ltd., "MEK") | 300 | 300 | 300 | 300 | 300 | 300 |
| Evaluation | | Weight reduction ratio at 330° C. (%) | 1.5 | 1.6 | 1.4 | 1.9 | 1.6 | 2.0 |
| | | Glass transition temperature | ○ | ○ | ○ | ○ | ○ | ○ |
| | | Long-term heat resistance | ○ | ○ | ○ | Δ | ○ | Δ |
| | | Adhesiveness | Δ | Δ | Δ | ○ | Δ | Δ |

TABLE 5

| | | | Examples | | | |
|---|---|---|---|---|---|---|
| | | | 18 | 19 | 20 | 21 |
| Composition (parts by weight) | Curable resin | Bisphenol F epoxy resin (available from DIC Corporation, "EPICLON EXA-830CRP") | 100 | 100 | 100 | 100 |
| | Curing agent | Imide oligomer composition M (imidizaion ratio 91%, containing an oligomer having a structure of formula (1-2) and a number average molecular weight of 650) | 50 | 500 | — | 114 |
| | | Imide oligomer composition W (imidizaion ratio 71%, containing an oligomer having a structure of formula (1-2) and a number average molecular weight of 660) | — | — | 163 | — |
| | | Diallylbisphenol A (available from Meiwa Plastic Industries, Ltd., "MEH-8000H") | — | — | — | 26 |
| | Curing accelerator | 2,4-Diamino-6-(2'-methylimidazolyl-(1'))-ethyl-s-triazine (available from Shikoku Chemicals Corporation, "2MZ-A", melting point 248° C. to 258° C.) | 5 | 5 | 5 | 5 |
| | Organic filler | Polyimide particles (available from Ube Industries, Ltd., "UIP-S") | — | — | — | — |
| | Fluidity modifier | Hydrophobic fumed silica (available from Tokuyama Corporation, "MT-10") | 5 | 5 | 5 | 5 |
| | Solvent | Methyl ethyl ketone (available from Wako Pure Chemical Industries, Ltd., "MEK") | 300 | 500 | 300 | 300 |
| Evaluation | | Weight reduction ratio at 330° C. (%) | 2.2 | 1.9 | 1.7 | 1.9 |
| | | Glass transition temperature | ○ | ○ | ○ | Δ |
| | | Long-term heat resistance | Δ | Δ | ○ | ○ |
| | | Adhesiveness | ○ | ○ | ○ | ○ |

TABLE 6

| | | | Examples | | |
|---|---|---|---|---|---|
| | | | 22 | 23 | 24 |
| Composition (parts by weight) | Curable resin | Bisphenol A epoxy resin (available from DIC Corporation, "EPICLON EXA-850CRP") | 100 | — | — |
| | | Resorcinol epoxy resin (available from Nagase ChemteX Corporation, "DENACOL EX-201P") | — | 100 | — |
| | | Phenol novolac epoxy resin (available from The Dow Chemical Company, "D.E.N. 431") | — | — | 100 |
| | Curing agent | Imide oligomer composition A (imidizaion ratio 92%, containing an oligomer having a structure of formula (1-1) and a number average molecular weight of 1380) | 136 | 323 | 133 |
| | Curing accelerator | 2,4-Diamino-6-(2'-methylimidazolyl-(1'))-ethyl-s-triazine (available from Shikoku Chemicals Corporation, "2MZ-A", melting point 248° C. to 258° C.) | 5 | 5 | 5 |
| | Organic filler | Polyimide particles (available from Ube Industries, Ltd., "UIP-S") | — | — | — |

TABLE 6-continued

|  |  |  | Examples | | |
|---|---|---|---|---|---|
|  |  |  | 22 | 23 | 24 |
|  | Fluidity modifier | Hydrophobic fumed silica (available from Tokuyama Corporation, "MT-10") | 5 | 5 | 5 |
|  | Solvent | Methyl ethyl ketone (available from Wako Pure Chemical Industries, Ltd., "MEK") | 300 | 300 | 300 |
| Evaluation |  | Weight reduction ratio at 330° C. (%) | 1.4 | 1.3 | 1.4 |
|  |  | Glass transition temperature | ○ | ○ | ○ |
|  |  | Long-term heat resistance | ○ | ○ | ○ |
|  |  | Adhesiveness | ○ | ○ | ○ |

TABLE 7

|  |  |  | Comparative Examples | | | | |
|---|---|---|---|---|---|---|---|
|  |  |  | 1 | 2 | 3 | 4 | 5 |
| Composition (parts by weight) | Curable resin | Bisphenol F epoxy resin (available from DIC Corporation, "EPICLON EXA-830CRP") | 100 | 100 | 100 | 100 | 100 |
|  | Curing agent | Imide oligomer composition H (imidizaion ratio 91%, containing an oligomer having a structure of formula (1-1) and a number average molecular weight of 4200) | 281 | — | — | — | — |
|  |  | Imide oligomer composition I (imidizaion ratio 91%, containing an oligomer having a structure of formula (1-1) and a number average molecular weight of 830) | — | 126 | — | — | — |
|  |  | Imide oligomer composition J (imidizaion ratio 25%, containing an oligomer having a structure of formula (1-1) and a number average molecular weight of 4240) | — | — | 253 | — | — |
|  |  | Imide oligomer composition K (imidizaion ratio 25%, containing an oligomer having a structure of formula (1-1) and a number average molecular weight of 850) | — | — | — | 126 | — |
|  |  | Trialkyltetrahydrophthalic anhydride (available from Mtsubishi Chemical Corporation, "YH-306") | — | — | — | — | 73 |
|  | Curing accelerator | 2,4-Diamino-6-(2'-methylimidazolyl-(1'))-ethyl-s-triazine (available from Shikoku Chemicals Corporation, "2MZ-A", melting point 248° C. to 258° C.) | 5 | 5 | 5 | 5 | 5 |
|  | Organic filler | Polyimide particles (available from Ube Industries, Ltd., "UIP-S") | — | — | — | — | — |
|  | Fluidity modifier | Hydrophobic fumed silica (available from Tokuyama Corporation, "MT-10") | 5 | 5 | 5 | 5 | 5 |
|  | Solvent | Methyl ethyl ketone (available from Wako Pure Chemical Industries, Ltd., "MEK") | 500 | 300 | 300 | 300 | 300 |
| Evaluation |  | Weight reduction ratio at 330° C. (%) | 2.5 | 3.0 | 3.3 | 3.3 | 3.0 |
|  |  | Glass transition temperature | ○ | ○ | ○ | ○ | ○ |
|  |  | Long-term heat resistance | x | x | x | x | x |
|  |  | Adhesiveness | x | x | Δ | x | ○ |

TABLE 8

|  |  |  | Comparative Examples | | | | |
|---|---|---|---|---|---|---|---|
|  |  |  | 6 | 7 | 8 | 9 | 10 |
| Composition (parts by weight) | Curable resin | Bisphenol F epoxy resin (available from DIC Corporation, "EPICLON EXA-830CRP") | 100 | 100 | 100 | 100 | 100 |
|  | Curing agent | Imide oligomer composition S (imidizaion ratio 90%, containing an oligomer having a structure of formula (1-2) and a number average molecular weight of 4610) | 649 | — | — | — | — |
|  |  | Imide oligomer composition T (imidizaion ratio 90%, containing an oligomer having a structure of formula (1-2) and a number average molecular weight of 490) | — | 131 | — | — | — |
|  |  | Imide oligomer composition U (imidizaion ratio 26%, containing an oligomer having a structure of formula (1-2) and a number average molecular weight of 4650) | — | — | 651 | — | — |
|  |  | Imide oligomer composition V (imidizaion ratio 23%, containing an oligomer having a structure of formula (1-2) and a number average molecular weight of 520) | — | — | — | 132 | — |

TABLE 8-continued

|  |  |  | Comparative Examples | | | | |
|---|---|---|---|---|---|---|---|
|  |  |  | 6 | 7 | 8 | 9 | 10 |
|  |  | Diallylbisphenol A (available from Meiwa Plastic Industries, Ltd., "MEH-8000H") | — | — | — | — | 87 |
|  | Curing accelerator | 2,4-diamino-6-(2'-methylimidazolyl-(1'))-ethyl-s-triazine (available from Shikoku Chemicals Corporation, "2MZ-A", melting point 248° C. to 258° C.) | 5 | 5 | 5 | 5 | 5 |
|  | Organic filler | Polyimide particles (available from Ube Industries, Ltd., "UIP-S") | — | — | — | — | — |
|  | Fluidity modifier | Hydrophobic fumed silica (available from Tokuyama Corporation, "MT-10") | 5 | 5 | 5 | 5 | 5 |
|  | Solvent | Methyl ethyl ketone (available from Wako Pure Chemical Industries, Ltd., "MEK") | 500 | 300 | 300 | 300 | 300 |
| Evaluation |  | Weight reduction ratio at 330° C. (%) | 2.8 | 3.2 | 3.2 | 3.5 | 1.5 |
|  |  | Glass transition temperature | ○ | ○ | ○ | ○ | x |
|  |  | Long-term heat resistance | x | x | x | x | x |
|  |  | Adhesiveness | x | Δ | x | x | ○ |

INDUSTRIAL APPLICABILITY

The present invention can provide an imide oligomer usable in a cured product that has a high glass transition temperature after curing and is excellent in thermal decomposition resistance, adhesiveness, and long-term heat resistance. The present invention can also provide a curable resin composition and an imide oligomer composition each containing the imide oligomer, an adhesive containing the curable resin composition, and a curing agent containing the imide oligomer composition.

The invention claimed is:

1. A curable resin composition comprising:
a curable resin; and
an imide oligomer composition,
the imide oligomer composition containing an imide oligomer having a structure of the following formula (1-1) and a number average molecular weight of 900 or more and 4,000 or less:

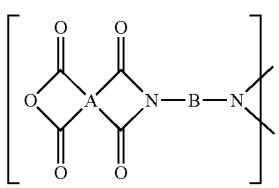
(1-1)

where, in the formula (1-1), A is a tetravalent group of the following formula (2-1) or the following formula (2-2); and in the formula (1-1), B is a divalent group of the following formula (3-1),
the formula (2-1) and the formula (2-2) being as follows:

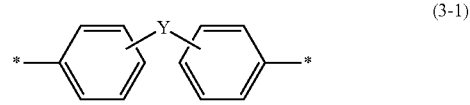

where, in the formula (2-1) and the formula (2-2), * is a binding site; in the formula (2-1), Z is a bond, an oxygen atom, or a substituted or unsubstituted divalent hydrocarbon group that may have an oxygen atom at a binding site; and in the formula (2-1) and the formula (2-2), a hydrogen atom of an aromatic ring may be replaced;

the formula (3-1) being as follows:

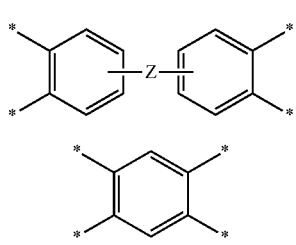
(3-1)

where, in the formula (3-1), * is a binding site; in the formula (3-1), Y is a bond, an oxygen atom, or a substituted or unsubstituted divalent hydrocarbon group; and in the formula (3-1), a hydrogen atom of an aromatic ring may be replaced; and the imide oligomer composition having an imidization ratio of 70% or higher.

2. The curable resin composition according to claim 1, wherein the imide oligomer composition contains at least one of an imide oligomer of the following formula (4-1), the following formula (4-2), the following formula (4-3), or the following formula (4-4), the formula (4-1), the formula (4-2), the formula (4-3), and the formula (4-4) being as follows:

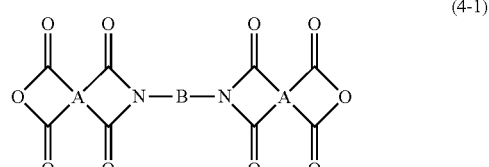
(4-1)

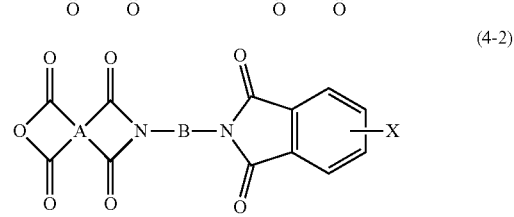
(4-2)

(4-3)

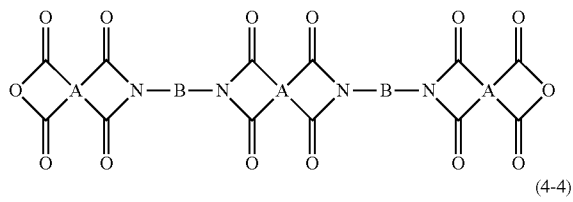

(4-4)

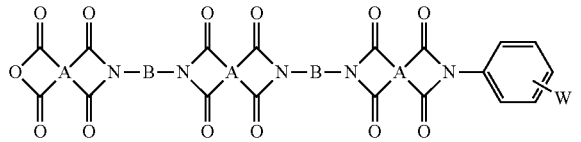

where, in the formulae (4-1) to (4-4), A is a tetravalent group of the following formula (6-1) or the following formula (6-2); in the formula (4-1), the formula (4-3), and the formula (4-4), each A may be the same or different; in the formulae (4-1) to (4-4), B is a divalent group of the following formula (7-1); in the formula (4-3) and the formula (4-4), each B may be the same or different; in the formula (4-2), X is a hydrogen atom, a halogen atom, or a substituted or unsubstituted monovalent hydrocarbon group; and in the formula (4-4), W is a hydrogen atom, a halogen atom, or a substituted or unsubstituted monovalent hydrocarbon group, the formula (6-1) and the formula (6-2) being as follows:

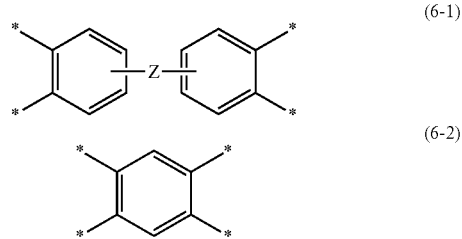

where, in the formula (6-1) and the formula (6-2), * is a binding site; in the formula (6-1), Z is a bond, an oxygen atom, or a substituted or unsubstituted divalent hydrocarbon group that may have an oxygen atom at a binding site; and in the formula (6-1) and the formula (6-2), a hydrogen atom of an aromatic ring may be replaced, the formula (7-1) being as follows:

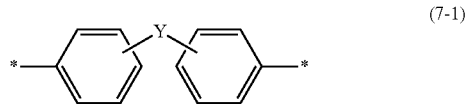

where, in the formula (7-1), * is a binding site; in the formula (7-1), Y is a bond, an oxygen atom, or a substituted or unsubstituted divalent hydrocarbon group; in the formula (7-1), a hydrogen atom of an aromatic ring may be replaced.

3. The curable resin composition according to claim 1, wherein the imide oligomer contains no siloxane skeleton in its structure.

4. The curable resin composition according to claim 1, wherein the imide oligomer is an imide oligomer having a melting point of 200° C. or lower.

5. The curable resin composition according to claim 1, wherein a cured product of the curable resin composition has a weight reduction ratio at 330° C. of less than 2.5%.

6. The curable resin composition according to claim 1, which has adhesion force to polyimide of 3.4 N/cm or more.

7. The curable resin composition according to claim 1, wherein a cured product of the curable resin composition has a glass transition temperature of 150° C. or higher.

8. An adhesive comprising
the curable resin composition according to claim 1.

9. An imide oligomer composition comprising an imide oligomer having a structure of the following formula (1-1) and a number average molecular weight of 900 or more and 4,000 or less,

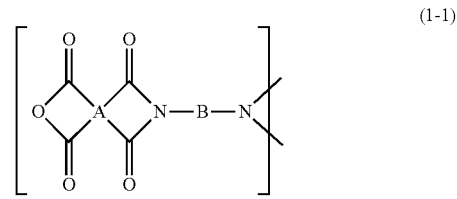

where, in the formula (1-1), A is a tetravalent group of the following formula (2-1) or the following formula (2-2); and in the formula (1-1), B is a divalent group of the following formula (3-1), the formula (2-1) and the formula (2-2) being as follows:

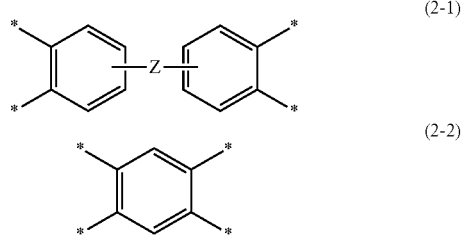

where, in the formula (2-1) and the formula (2-2), * is a binding site; in the formula (2-1), Z is a bond, an oxygen atom, or a substituted or unsubstituted divalent hydrocarbon group that may have an oxygen atom at a binding site; and in the formula (2-1) and the formula (2-2), a hydrogen atom of an aromatic ring may be replaced;

the formula (3-1) being as follows:

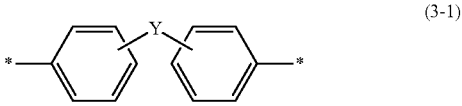

where, in the formula (3-1), * is a binding site; in the formula (3-1), Y is a bond, an oxygen atom, or a substituted or unsubstituted divalent hydrocarbon group; and in the formula (3-1), a hydrogen atom of an aromatic ring may be replaced, the imide oligomer composition having an imidization ratio of 70% or higher.

10. The imide oligomer composition according to claim 9, which contains an imide oligomer of the following formula (4-1), the following formula (4-2), the following formula (4-3), or the following formula (4-4), the formula (4-1), the formula (4-2), the formula (4-3), and the formula (4-4) being as follows:

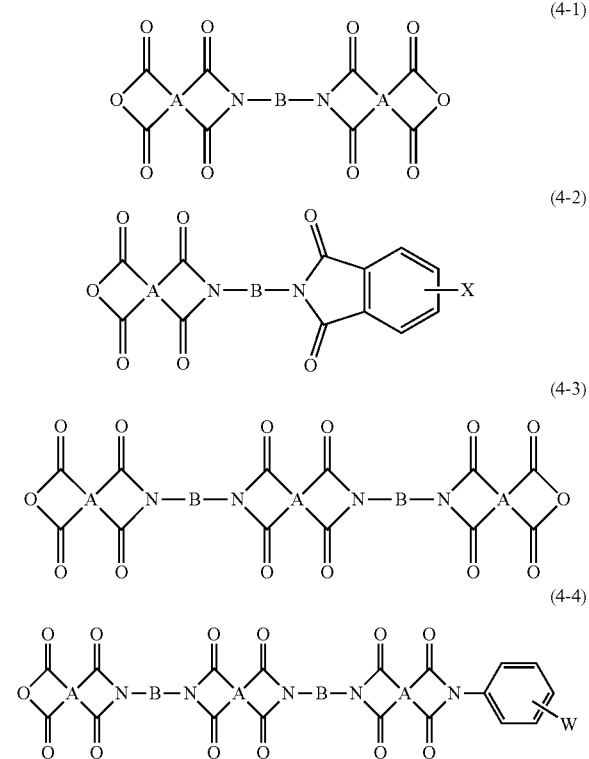

where, in the formulae (4-1) to (4-4), A is a tetravalent group of the following formula (6-1) or the following formula (6-2); in the formula (4-1), the formula (4-3), and the formula (4-4), each A may be the same or different; in the formulae (4-1) to (4-4), B is a divalent group of the following formula (7-1); in the formula (4-3) and the formula (4-4), each B may be the same or different; in the formula (4-2), X is a hydrogen atom, a halogen atom, or a substituted or unsubstituted monovalent hydrocarbon group; and in the formula (4-4), W is a hydrogen atom, a halogen atom, or a substituted or unsubstituted monovalent hydrocarbon group, the formula (6-1) and the formula (6-2) being as follows:

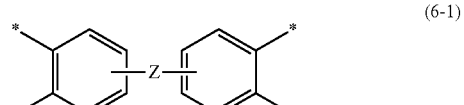

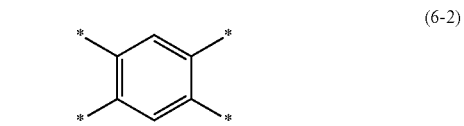

where, in the formula (6-1) and the formula (6-2), * is a binding site; in the formula (6-1), Z is a bond, an oxygen atom, or a substituted or unsubstituted divalent hydrocarbon group that may have an oxygen atom at a binding site; and in the formula (6-1) and the formula (6-2), a hydrogen atom of an aromatic ring may be replaced, the formula (7-1) being as follows:

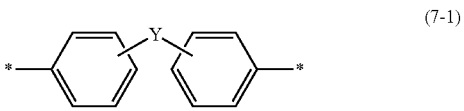

where, in the formula (7-1), * is a binding site; in the formula (7-1), Y is a bond, an oxygen atom, or a substituted or unsubstituted divalent hydrocarbon group; in the formula (7-1), a hydrogen atom of an aromatic ring may be replaced.

11. The imide oligomer composition according to claim 9, wherein the imide oligomer contains no siloxane skeleton in its structure.

12. The imide oligomer composition according to claim 9, wherein the imide oligomer has a melting point of 200° C. or lower.

13. The imide oligomer composition according to claim 9, wherein the imide oligomer is formed using an aromatic acid dianhydride having a melting point of 240° C. or lower as a raw material.

14. The imide oligomer composition according to claim 9, which is soluble in an amount of 3 g or more in 10 g of tetrahydrofuran at 25° C.

15. A curing agent comprising
the imide oligomer composition according to claim 9.

* * * * *